(12) United States Patent
Schleicher

(10) Patent No.: US 9,921,064 B2
(45) Date of Patent: *Mar. 20, 2018

(54) METHOD AND SYSTEM FOR GUIDANCE OF OFF-ROAD VEHICLES

(71) Applicant: Deere & Company, Moline, IL (US)

(72) Inventor: Tyler D. Schleicher, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 173 days.

This patent is subject to a terminal disclaimer.

(21) Appl. No.: 14/977,825

(22) Filed: Dec. 22, 2015

(65) Prior Publication Data

US 2017/0122740 A1    May 4, 2017

Related U.S. Application Data

(60) Provisional application No. 62/248,567, filed on Oct. 30, 2015.

(51) Int. Cl.
| | |
|---|---|
| *G06F 17/00* | (2006.01) |
| *G01C 21/10* | (2006.01) |
| *A01B 69/04* | (2006.01) |
| *G01C 21/14* | (2006.01) |

(52) U.S. Cl.
CPC ............ *G01C 21/10* (2013.01); *A01B 69/008* (2013.01); *G01C 21/14* (2013.01)

(58) Field of Classification Search
CPC ...... G01C 21/10; G01C 21/20; A01B 69/008; G01S 2205/002; G01S 19/14
USPC .............. 701/36, 41, 50, 25, 466; 172/4.5, 9
See application file for complete search history.

(56) References Cited

U.S. PATENT DOCUMENTS

| | | |
|---|---|---|
| 5,181,572 A | 1/1993 | Andersen et al. |
| 6,079,192 A | 6/2000 | Rasmussen |
| 7,716,905 B2 | 5/2010 | Wilcox et al. |
| 2011/0118926 A1* | 5/2011 | Peake .................. G05D 1/0227 701/25 |
| 2015/0334919 A1 | 11/2015 | Schleicher |
| 2015/0334920 A1 | 11/2015 | Schleicher et al. |

FOREIGN PATENT DOCUMENTS

| | | | |
|---|---|---|---|
| EP | 0381073 A2 * | 1/1990 | |
| EP | 1795986 B1 | 6/2007 | |

* cited by examiner

*Primary Examiner* — Gertrude Arthur Jeanglaude

(57) ABSTRACT

A method and system for guidance of an off-road vehicle comprises a crop row sensor for sensing position data for one or more crop rows. A primary guidance path of the vehicle is determined based on the sensed position data for the one or more crop rows if there not a material gap in the crop row for the current location of the vehicle. Alternately or cumulatively, a secondary guidance path of the vehicle is determined based on a historic path heading of the vehicle if there is the material gap in a crop row for a current location of the vehicle.

20 Claims, 6 Drawing Sheets

METHOD AND SYSTEM FOR GUIDANCE OF OFF-ROAD VEHICLES

RELATED APPLICATION

This document (including the drawings) claims priority and the benefit of the filing date based on U.S. provisional application No. 62/248,567, filed Oct. 30, 2015 under 35 U.S.C. § 119 (e), where the provisional application is hereby incorporated by reference herein.

FIELD OF THE DISCLOSURE

This disclosure relates to a method and system for guidance of off-road vehicles.

BACKGROUND

In certain prior art, crop row sensors may be used to sense the position of crop rows to guide an off-road vehicle properly with respect to the crop row for performing an agricultural task, such as spraying, treating, or harvesting the crop. In some prior art, crop row sensors may comprise arms that contact the plants with the crop rows to establish a central position of the vehicle with respect to the crop row. In other prior art, crop row sensors may use image processing (e.g., stereo vision) or electromagnetic radiation (e.g., a laser scanning transmitter and receiver) to estimate the orientation of crop rows with respect to the vehicle. If there are gaps in the crop row because of seeds that did not germinate, damaged plants, or otherwise, the crop row sensors may not be able to provide a reliable estimate of the central position of the vehicle with respect to the crop row. Further, if the vehicle (e.g., sprayer) travels at higher speed, the crop row sensors may not be able to provide reliable real-time estimates of the central position of the vehicle with respect to the crop row. Accordingly, there is a need for an improved method and system for guidance of off-road vehicles.

SUMMARY

In accordance with one embodiment, a method and system for guidance of an off-road vehicle comprises a crop row sensor for sensing position data for one or more crop rows. A primary guidance path of the vehicle is determined based on the sensed position data for the one or more crop rows if there not a material gap in the crop row for the current location of the vehicle. Alternately or cumulatively, a secondary guidance path of the vehicle is determined based on a historic path heading of the vehicle if there is the material gap in a crop row for a current location of the vehicle.

DETAILED DESCRIPTION

Figure 1:
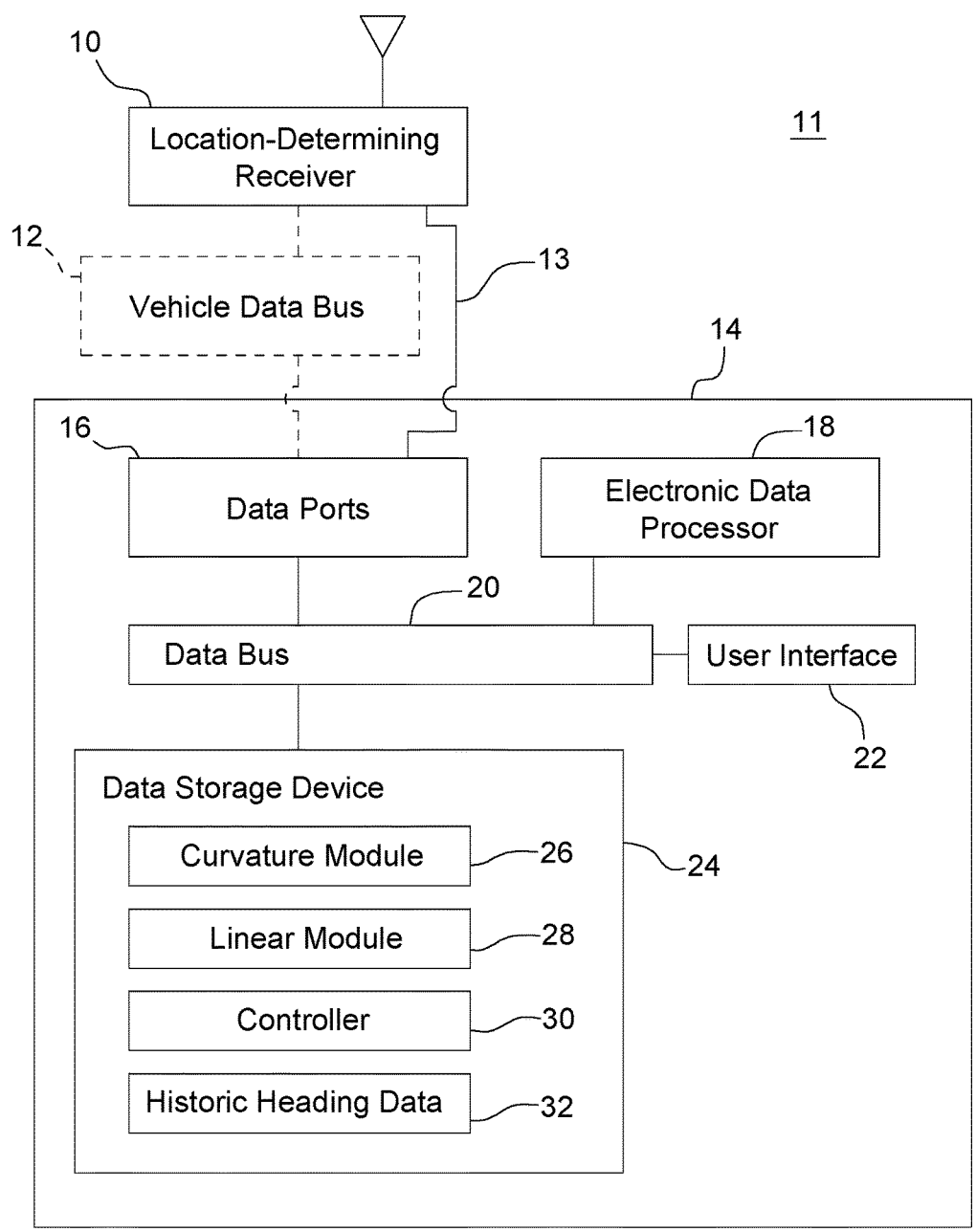
FIG. 1 is a block diagram of first embodiment of a system for guidance of off-road vehicles.

In accordance with FIG. 1, one embodiment of a system 11 for guidance of off-road vehicles comprises an electronic data processing system 14 that is coupled to a location-determining receiver 10 directly, or via an optional vehicle data bus 12. The optional vehicle data bus 12 is shown in dashed lines because it is optional and the connection between the electronic data processing system 14 and location-determining receiver 10 may be direct, as indicated by transmission line 13, which can be used separately or cumulatively with the interconnection via the optional vehicle data bus 12.

In one embodiment, the electronic data processing system 14 comprises an electronic data processor 18, one or more data ports 16, a user interface 22 and data storage device 24 coupled to a data bus 20. The data storage device 24 may store, retrieve, read and write one or more of the following items: a curvature module 26, a linear module 28, a controller 30, and historic heading data 32. A module means software, electronics, or both. As used herein, heading can refer to: (1) an angular direction of travel of the vehicle with reference to due North or magnetic North, or (2) a yaw or yaw angle of the vehicle with reference to coordinate system, such as a Cartesian coordinate system.

The electronic data processor 18 may comprise a processor, a microcontroller, a digital signal processor, an application specific integrated circuit (ASIC), a programmable logic array, a programmable logic device, a logic circuit, an arithmetic logic unit, a Boolean logic device, or another data processing device.

The data port 16 may comprise a data transceiver 40, buffer memory 42, or both. The user interface 22 may comprise one or more of the following: a display, a touch screen display, a keypad, a keyboard, a control panel, a pointing device (e.g., electronic mouse), or another device for entry or output of data from the data processing system 14.

The data storage device 24 may comprise one or more of the following: electronic memory, nonvolatile electronic memory, an optical data storage device, a magnetic data storage device, or other device for storing digital or analog data.

In one embodiment, the controller 30 comprises logic for deciding whether or not to use the curvature module 26 or the linear module 28 for estimating the projected heading of the vehicle at any given time or at a current location of the vehicle. For example, the controller 30 or the data processor 18 is arranged to determine the estimated curvature and compare the estimated curvature to a threshold to decide whether or not to use the curvature or the linear module 28 for estimating the projected heading of the vehicle, or deciding between the first guidance mode and the second guidance mode. The data processor 18 or controller 30 may determine the estimated curvature of the historic path of the vehicle in accordance with the following equation: $C=\Delta P/D$, where C is the curvature, $\Delta P$ is the path heading change (e.g., recent historic path heading change), and D is the path distance (e.g., recent historic path distance traversed).

In one embodiment, the curvature module 26 comprises software instructions (files, or data) related to determining or estimating a projected heading of a vehicle based on historic path heading data stored in, retrieved from or associated with the data storage device 24. For example, a curvature module 26 is configured to determine a secondary guidance path based on a running average (e.g. mode, mean or median) of the recent historic path heading consistent with a curvature limit of a curved path plan if the estimated curvature of the recent historic path heading is greater than, or equal to, a threshold.

In one embodiment, the linear module 28 comprises software instructions related to determining or estimating a projected heading of a vehicle based on recent historic path heading data stored in, retrieved from or associated with the data storage device 24. For example, a linear module 28 determines the secondary guidance path based on a running average (e.g., mode, mean or median) of the recent historic path heading consistent with a linear limit of a curved path plan if the estimated curvature of the recent historic path heading is less than a threshold.

As used in this document, configured to, adapted to and arranged to may refer any of the following items: (1) software or program instructions that are stored in the data storage device 24 or other data storage and executable by the data processor 18 to perform certain functions, software, (2) software or embedded firmware that are stored in the location-determining receiver 10 or its memory or data storage to perform certain functions, or (3) electronic, electrical circuits or modules that can perform substantially equivalent functions to the software, embedded firmware or program instructions.

In one embodiment, the location-determining receiver 10 provides one or more of the following types of data for a vehicle: historic heading data 32, heading data, velocity data, and location data. The location-determining receiver 10 may comprise a satellite navigation receiver, a Global Navigation Satellite System (GNSS) receiver, a Global Positioning System (GPS) receiver, or another receiver for determining position data, velocity data, and heading data for the vehicle. For example, the location-determining receiver 10 may comprise a satellite navigation receiver with differential correction for providing precise position data, velocity data and heading data for the vehicle. A separate receiver or transceiver (e.g., satellite, cellular, or wireless device) may receive the correction data or differential correction data via a wireless signal transmitted from a satellite or a terrestrial base station (e.g., real-time kinematic (RTK) base station).

In one embodiment, a location-determining receiver 10 is arranged to determine the secondary guidance path based on the historic path heading consistent with headings estimated by a location-determining receiver 10 for corresponding historic locations of the vehicle. The historic path heading may have substantially linear path segments, substantially curved path segments or both.

Figure 2:
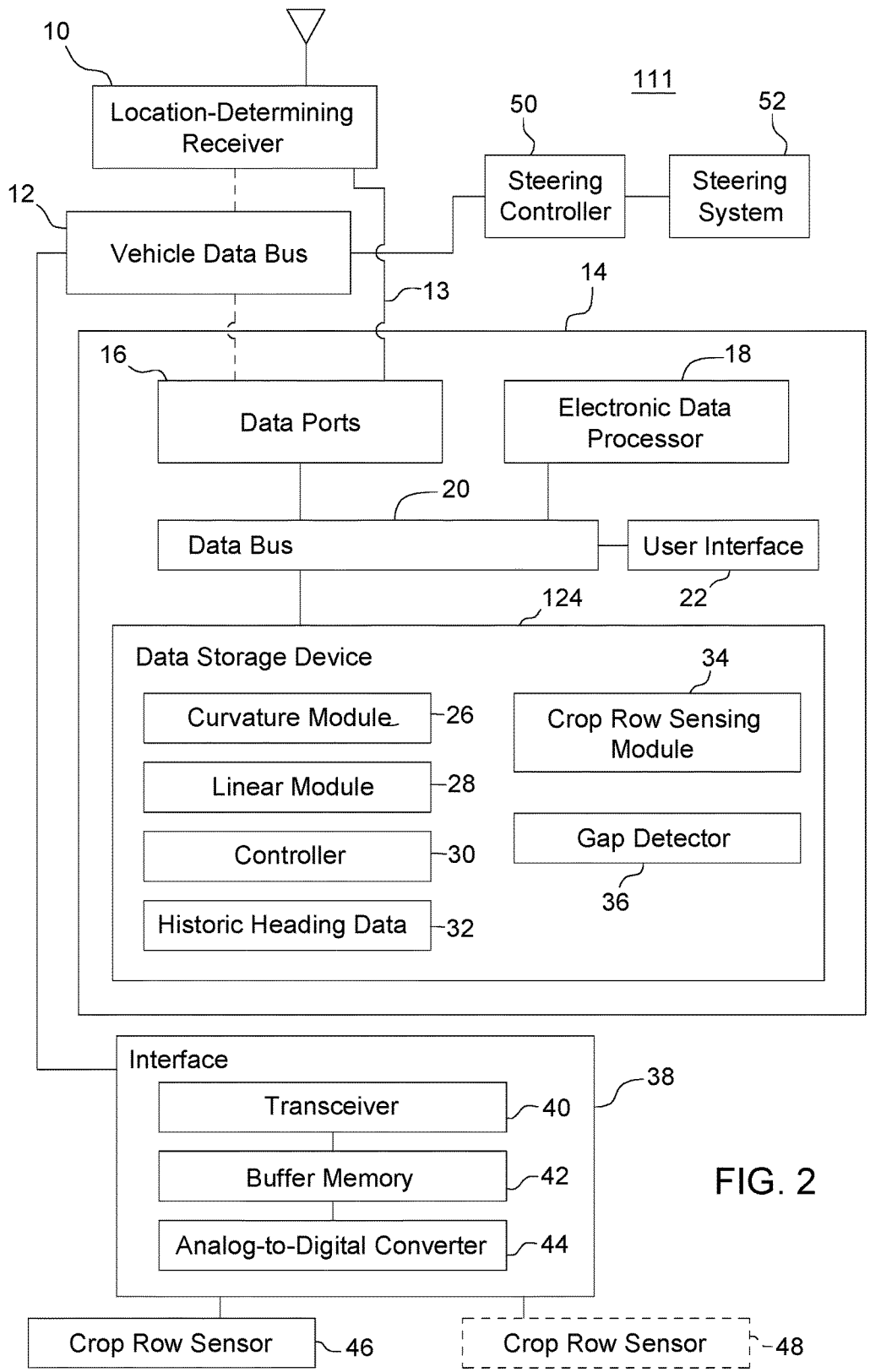
FIG. 2 is a block diagram of a second embodiment of a system for guidance of off-road vehicles.

The system 111 of FIG. 2 is similar to the system 11 of FIG. 1, except the system 111 of FIG. 2 further comprises an interface 38, one or more crop row sensors (46, 48), a steering controller 50 and a steering system 52. Further, the data storage device 124 is similar to data storage device 24 except data storage device 124 further stores, retrieves, writes or reads a crop row sensing module 34 and a gap detector 36.

In one embodiment, the interface 38 is coupled to the vehicle data bus 12. In turn, one or more crop row sensors (46, 48) are coupled to the interface 38. In one configuration, each crop row sensors (46, 48) comprises an arm for contacting one or more plants, where the arm has a magnet secured or embedded therein and where a magnetic field sensor (e.g., Hall Effect sensor) is spaced apart from the magnet to detect any change in the magnetic field from each arm's contacting or striking the plants and to generate or produce a resultant electrical signal (e.g., time-varying electrical signal). For instance, the output terminals of the magnetic field sensor are coupled to the interface 38 or the analog-to-digital converter 44.

In one example, the interface 38 comprises an analog-to-digital converter 44, buffer memory 42 and a transceiver 40. The analog-to-digital converter 44 is arranged for changing the resultant electrical signal from an analog signal to a digital signal. The interface 38 further comprises buffer memory 42 for receiving and storing the digital signal prior to or during transmission of the digital signal to the vehicle data bus 12 or the data processing system 14 via the transceiver 40.

In one embodiment, the crop row sensing module 34 is adapted to determine a central position or series of central positions between two adjacent crop rows that are sensed by the pair of the crop crow sensors. The gap detector 36 detects a material gap in one or more plant rows by analyzing or evaluating digitized electrical signals, or associated data, provided by one or more crop row sensors (46, 48) or derived data of the digitized electrical signals from the crop row sensing module 34.

A steering controller 50 can be coupled to the vehicle data bus 12. In turn, the steering controller 50 is coupled to a steering system 52. In one example, the steering system 52 comprises an actuator or an electrical motor that is mechanically coupled or linked to a mechanical steering system, a rack and pinion steering system, an Ackerman steering system or another steering system. In another example, the steering system 52 comprises an electro-hydraulic steering system where the an electrical actuator controls one or more hydraulic valves for steering a vehicle.

Figure 3A:
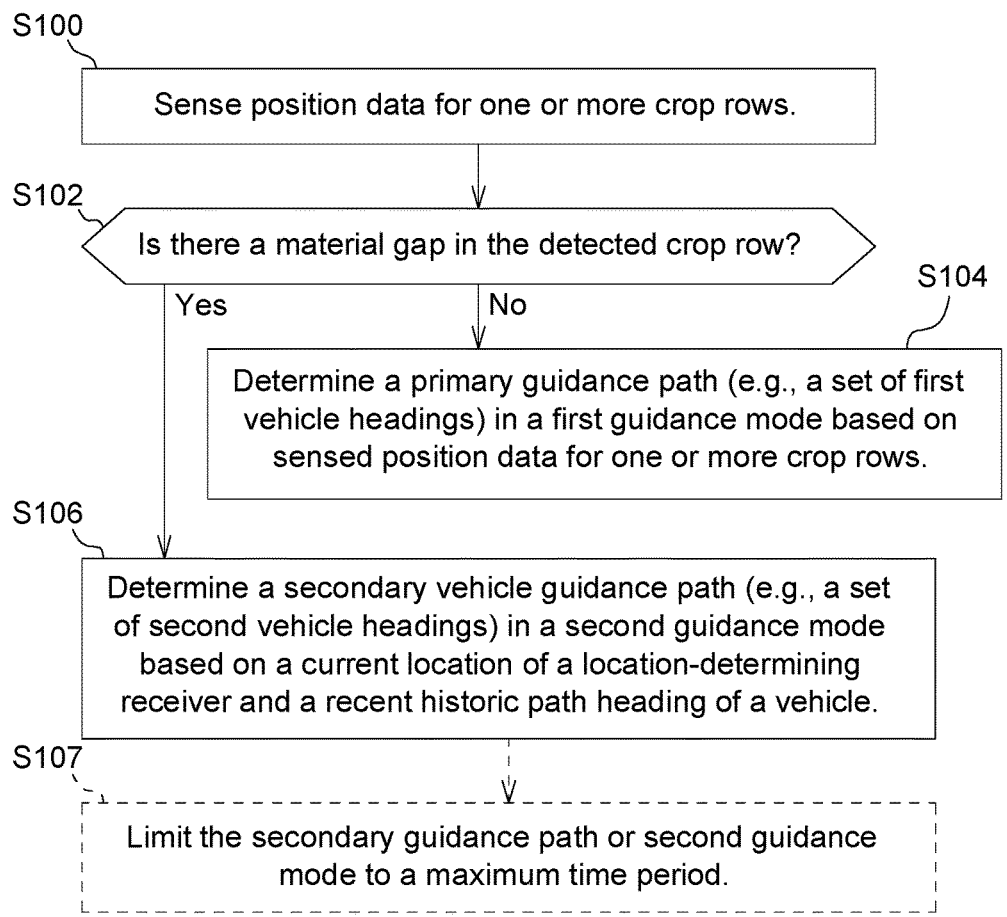
FIG. 3A is flow chart of a first embodiment of a method for guidance of off-road vehicles.

FIG. 3A is flow chart of a first embodiment of a method for guidance of off-road vehicles. The method of FIG. 3A begins in step S100.

In step S100, a crop row sensor 46 senses position data for one or more crop rows along a vehicle path or a set of points on the vehicle path of the vehicle. For example, each crop row sensor (46, 48) outputs or provides one or more electrical signals, such as a time-varying electrical signal (or first pattern), indicative of the presence, proximity or position of plants in crop rows, such as the proximity or position of crop rows with respect to a reference point on or associated with the vehicle. In particular, the electrical signal (or its first pattern) outputted by the crop row sensor (46, 48) varies with the proximity or distance of the crop row sensor (46, 48) or its contact arm, to the stalk or plant within the row; hence, the proximity of the vehicle (or its reference point on or associated with the vehicle) to the stalk or plant in the sensed row of plants.

In step S102, the crop row sensing module 34, the gap detector 36, the data processor 18, or the data processing system 14 determines if there is a material gap in the detected crop row. Step S102 may be executed by various techniques, which may be applied separately or cumulatively. A material gap in the detected crop row can refer to one or more missing plants, down or wind-damaged plants, drought-damaged plants, weather-damaged plants, insect-damaged plants, disease-damaged plants, chemical-damaged plants, or otherwise missing, absent, stunted, or structurally damaged plants. Under a first technique, the electrical signal or signals outputted by a crop row sensor (46, 48) has a first pattern associated of electrical signal with the presence of plants in crop rows and a second pattern of the electrical signal associated with an absence of plants in the rows or a material gap in the crop row that exceeds a threshold gap size.

Under a second technique, the gap detector 36 or the data processor 18 defines a material gap in the detected crop row based on the size (e.g., length in direction of travel of vehicle) of the gap in a plant row exceeding a threshold gap size (e.g., threshold gap length in the direction of travel of the vehicle), or the time duration of a detected gap associated with a vehicle operating a particular velocity (e.g., ground speed) and acceleration.

Under a third technique, the gap detector 36 or the data processor 18 detects a material gap that is indicated by a time-varying signal that decays in amplitude or in resonance over one or more sampling intervals of the data processing system 14. If the there is a material gap in the detected crop row, the method continues with step S106. However, if there is not a material gap in the detected crop row, then the method continues with step S104.

In step S104, the crop row sensing module 34, the data processor 18, or the data processing system 14 determines a primary guidance path (e.g., set of one or more first guidance headings) of the vehicle in a first guidance mode based on the sensed position data for one or more crop rows or sensed crop rows in accordance with output of one or more crop row sensors (46, 48). Step S104 may be carried out by various processes, which may be applied alternately or cumulatively. Under a first process for carrying out step S104, the primary guidance path of the vehicle generally tracks the plant rows or is generally parallel to one or more plant rows in accordance with a first guidance mode from position data provided by one or more crop row sensors (46, 48).

Under a second process, the crop row sensing module 34, the data processor 18, or the data processing system 14 determines the primary guidance path based on a central position between two adjacent crop rows that are sensed by arms of contact sensors on the vehicle or an implement of the vehicle. Accordingly, the crop row sensing module 34, the data processor 18, or the data processing system 14 aligns the vehicle path or primary guidance path to the central position or a series of central position points between two adjacent crop rows.

Under a third process, data processor 18, a crop row sensing module 34 or a data processing system 14 determines the primary guidance path based on an evaluation of electrical signals, reference electrical signals, or time-varying electrical signals of the crop row sensors (46, 48) to estimate the vehicle position relative to one or more crop rows. In particular, if a first crop row sensor 46 faces a first row and a second crop row sensor 48 faces a second row adjacent to the first row, the first electrical signals of the first crop sensor 46 and the second electrical signals of the second crop sensor 48 may be substantially equivalent (or calibrated to be equivalent or within a tolerance of each other) where the vehicle is centered at a central position between the first row and the second row (e.g., at any given time). Accordingly, a reference electrical signal can be associated with a central position (or series of central position points) of the vehicle between the first row and the second row of crops or plants, and a difference between the observed electrical signal of either crop row sensor (46, 48) and the reference electrical signal represents an error that can be used to adjust the heading of the vehicle to minimize or reduce such error.

Under a fourth process, the primary guidance path of the vehicle can be defined as a set of primary vehicle headings versus observed or current locations of the vehicle that are consistent with tracking of the plant rows. For certain agricultural tasks, like spraying or applying crop inputs, the position of the vehicle in the rows can be aligned such that the tires, wheels or tracks of the vehicle are aligned to avoid running over, crushing or damaging the plants in each crop row. For other agricultural tasks, like harvesting crop, the harvesting machine or combine works most efficiently when the stalks or plants of a row or rows are properly or centrally aligned to a header (or intake openings) of the harvesting machine or combine.

In step S106, the data processor 18 or data processing system 14 determines secondary vehicle guidance path (e.g., a set of one or more second vehicle headings) in a second guidance mode based on a current location of the location-determining receiver 10 and a recent historic path heading (e.g., an average, mean, median or mode historic path heading over a recent predetermined time period) or set of historic path headings of the vehicle. For example, the location-determining receiver 10 provides or provided a set of recent historic path headings and corresponding recent historic location data for a previous path segment that the vehicle traversed (over a recent predetermined time period); the data storage device 24 can store or stored the set of historic path headings and corresponding historic location data (e.g., coordinated on the previous vehicle path segment, such as a substantially linear segment or curved segment) in the data storage device 24 (e.g., buffer memory). The secondary guidance path can comprise segments that are substantially linear, substantially curved (e.g. arcs), or both connected to each other any sequence on an end-to-end basis. The secondary guidance path of the vehicle generally tracks the plant rows or is generally parallel to one or more plant rows in accordance with a second guidance mode from position data provided by a location-determining receiver 10, such as a satellite navigation receiver. Further, the secondary guidance path of the vehicle can be defined as a set of secondary vehicle headings versus observed or current locations of the vehicle that are consistent with the historic path heading of the vehicle, or tracking of the plant rows, or both.

Optional step S107 may follow step S106 as indicated by the dashed lines. However, step S107 may be deleted from certain embodiments of the method of FIG. 3A.

In step S107, the data processor 18 or data processing system 14 limits the secondary guidance path or second guidance mode to a maximum time period. Step S107 may be executed in accordance with various techniques that may be applied separately or cumulatively. Under a first technique, the data processor 18 or data processing system 14 limits the second guidance mode to a maximum time period where the method continues by returning to step S100.

Under a second technique for carrying out step S107, the data processor 18 data processing system 14 returns (e.g., directly to step S104) to the first guidance mode after the maximum time period has expired, where the maximum time period can be proportional to the gap size or gap length of plants in the plant rows (e.g., average, median, mode gap size for a particular crop in a particular geographic region or field) associated with the crop row sensor 46s given the velocity, acceleration or both of the vehicle.

Under a third technique for step S107, for a limited time period or a maximum time period, the second guidance mode based on location data of the location-determining receiver 10 can supplement, augment or temporarily replace the first guidance mode based on position data from one or more crop row sensors (46, 48), in accordance with availability or reliability of the position data from the crop row sensors (46, 48) on the relative position of the vehicle to the crop rows.

Under a fourth technique for step S107, the data processing system 14 or data processor 18 can smooth, taper, or gradually introduce and effectuate the transition between a set of primary headings in the first guidance mode and a set of secondary headings in the second guidance mode to avoid abrupt steering movements of the vehicle that might depart from proper alignment of the vehicle to a central portion of the crop row.

Figure 3B:
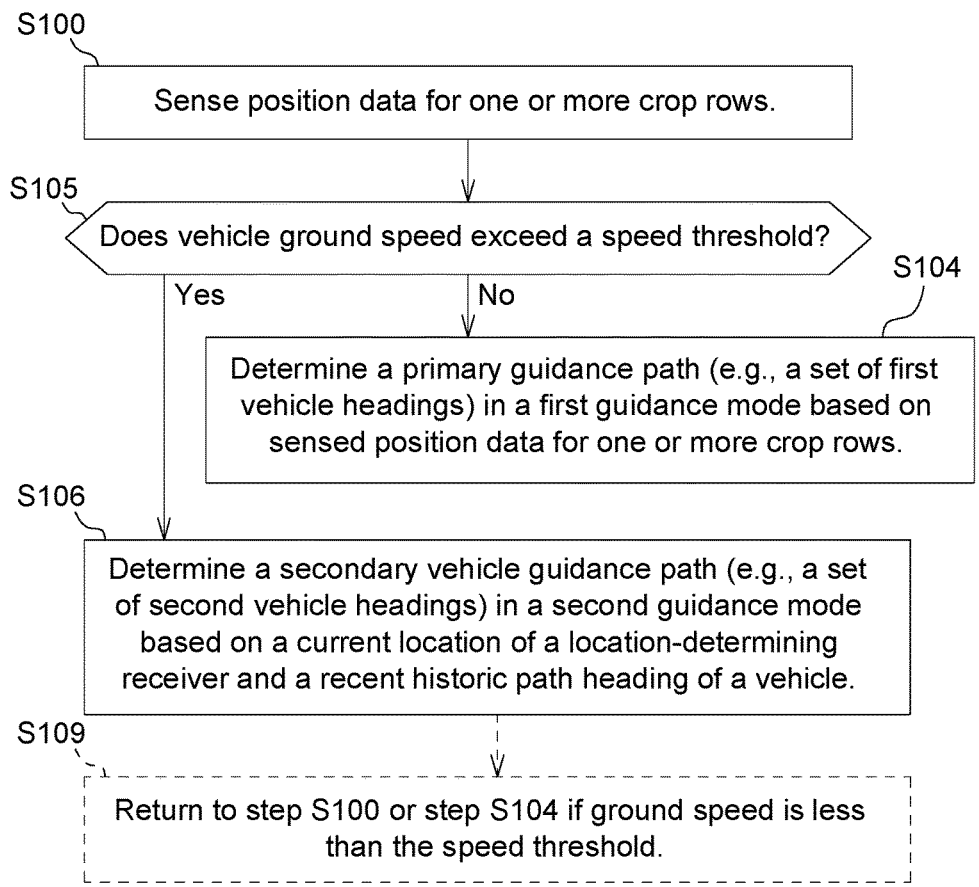
FIG. 3B is a flow chart of a second embodiment of a method for guidance of off-road vehicles.

FIG. 3B is a flow chart of a second embodiment of a method for guidance of off-road vehicles. The method of FIG. 3B is similar to the method of FIG. 3A, except step S102 is replaced by step S105 and step S107 is replaced by step S109. Like steps or procedures in FIG. 3A and FIG. 3B are indicated by like reference numbers.

In step S105, the data processor 18, controller 30 or data processing system 14 determines whether the vehicle ground speed exceeds, or equals, a speed threshold (e.g., maximum speed). The location-determining receiver 10 can provide an estimate of speed or velocity, or position data that can be used to estimate the speed of the vehicle. Alternately, dead-reckoning sensor, odometer sensor, speedometer sensor, or radar system 11 can estimate the ground speed of the vehicle and provide such estimate to the data processing system 14.

Optional step S109 may follow step S105 as indicated by the dashed lines. However, step S109 may be deleted from certain embodiments of the method of FIG. 3B.

In step S109, the data processor 18 or data processing system 14 returns to step S100 or to step S104 if the vehicle ground speed is less than the speed threshold for a predetermined time period. Step S109 may be executed in accordance with various techniques that may be applied separately or cumulatively. Under a first technique, the data processor 18 or data processing system 14 returns to step S100 if the vehicle ground speed is less than the speed threshold for a predetermined time period.

Under a second technique for carrying out step S107, the data processor 18 or data processing system 14 returns to step S104 if the vehicle ground speed is less than the speed threshold for a predetermined time period.

Under a third technique for step S109, for a limited time period or a maximum time period, the second guidance mode based on location data of the location-determining receiver 10 can supplement, augment or temporarily replace the first guidance mode based on position data from one or more crop row sensors (46, 48), in accordance with availability or reliability of the position data from the crop row sensors (46, 48) on the relative position of the vehicle to the crop rows.

Under a fourth technique for step S109, the data processing system 14 or data processor 18 can smooth, taper, or gradually introduce and effectuate the transition between a set of primary headings in the first guidance mode and a set of secondary headings in the second guidance mode to avoid abrupt steering movements of the vehicle that might depart from proper alignment of the vehicle to a central portion of the crop row.

Figure 4:
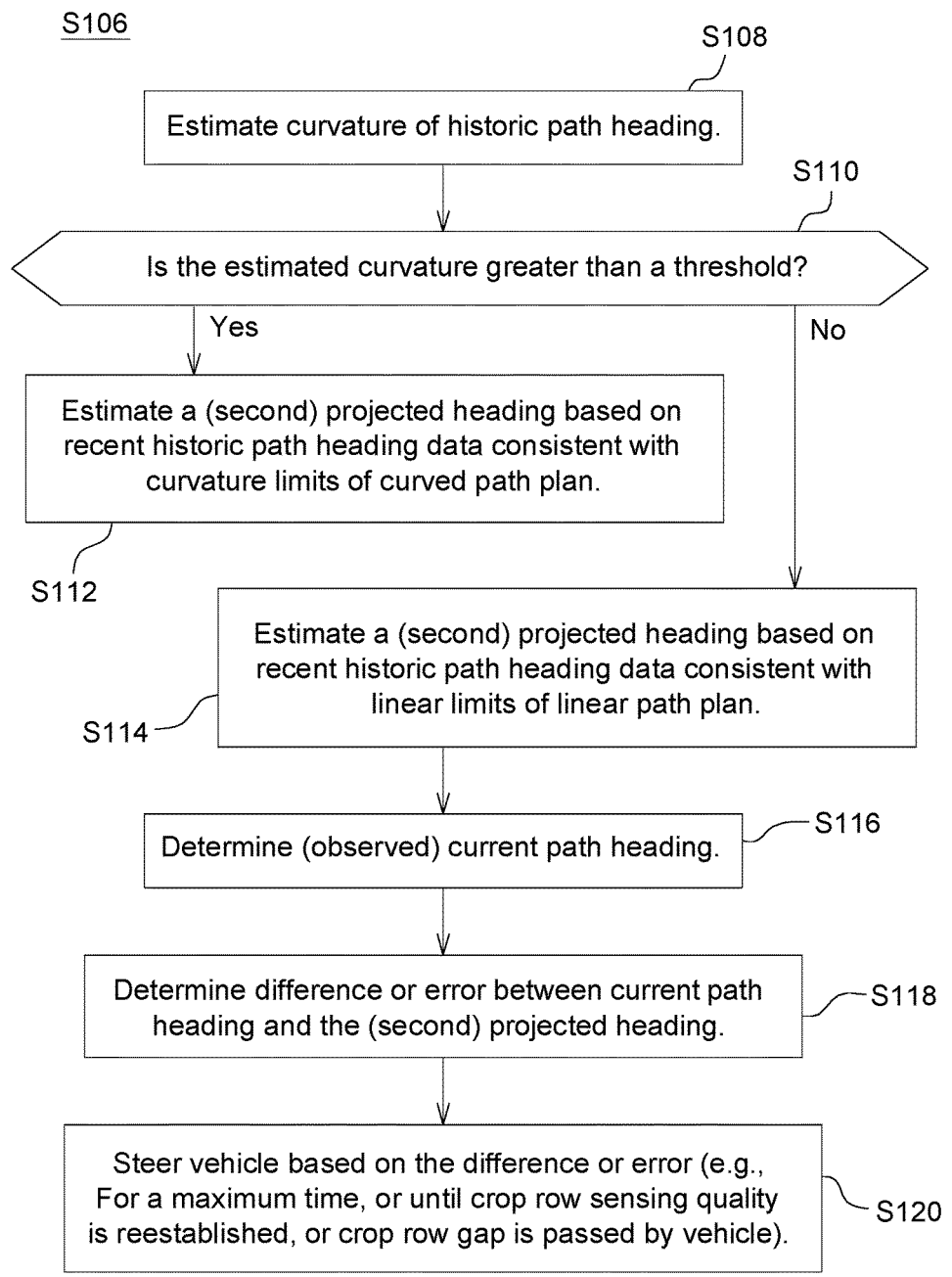
FIG. 4 is block diagram for a third embodiment of a method for guidance of off-road vehicles.

FIG. 4 is block diagram for a third embodiment of a method for guidance of off-road vehicles. In one embodiment, the steps of FIG. 4 represent sub-steps or processes of step S106 of FIG. 3A, FIG. 3B, or both. FIG. 4 starts with step S108.

In step S108, a data processor 18 or controller 30 estimates curvature of a historic path heading of a vehicle or the previous path of the vehicle. For example, as the vehicle travels in an aligned position with respect to the crop rows, a set of historic path heading data versus location data is established for subsequent reference to estimate the curvature of the historic path heading.

In step S110, a data processor 18 or controller 30 determines whether the estimated curvature is greater than a threshold, or greater than or equal to the threshold. For example, the data processor 18 or controller 30 determines the estimated curvature based on the following equation: $C=\Delta P/D$, where C is the curvature, $\Delta P$ is the path heading change, and D is the path distance. Although the threshold may have other suitable values, in one embodiment the threshold is equal to approximately 0.5. If the estimated curvature is equal to the threshold, or greater than or equal to the threshold, the method continues with step S112. However, if the estimated curvature is less than the threshold, then the method continues with step S114.

In step S112, a data processor 18, curvature module 26, or data processing system 14 estimates a (second) projected heading of a substantially curved path based on recent historic path data (e.g., recent historic path heading data versus location data) with one or more curvature limits of the curved path or curved path plan. In a first example of executing step S112, data processor 18, curvature module 26 or the data processing system 14 estimates (e.g., in real-time) a set of projected headings for a current or future vehicle path based on a running average or sliding window of the historic path (e.g., sufficiently recent or immediately preceding the current or future vehicle path). The running average may refer to a mean, mode, or median of the heading over a certain time period preceding or immediately preceding the project headings or current or future vehicle path.

In a second example of executing step S112, the data processor 18 or data processing system 14 can determine the secondary guidance path based on a running average of the historic path heading consistent with a curvature limit of a curved path plan if the estimated curvature of the historic path heading is greater than, or equal to, a threshold.

In a third example of executing step S112, the data processor 18, curvature module 26 or the data processing system 14 estimates a set of (second) projected headings for a current or future vehicle path based on an predetermined linear path segment (e.g., A-B line) that is aligned with the one or more crop rows or parallel to the previous crop rows.

In a fourth example of executing step S112, the curvature limit may be based on any of the following factors: (1) a length or distance of the historic path or historic path segments, (2) the precision or reliability level of the historic heading data 32 or historic location data from the location-determining receiver 10 (e.g., based on availability of differential correction data, real-time kinematic correction data from one or more base stations, or convergence on a carrier phase solution for position, or dilution of precision estimates), (3) a maximum curvature based on the turning radius of the vehicle, (4) heading angle or yaw zone restrictions related to avoiding a boundary of the field or work area, or (5) heading angle or yaw zone restrictions, with or without ground-speed restrictions, related to a keep-out region of a work area or an obstacle in a projected path of the vehicle.

In step S112, any combination or permutation of the above examples may be executed together or separately.

In step S114, a data processor 18, curvature module 26, or data processing system 14 estimates a (second) projected heading of a substantially linear path based on recent historic path heading data (e.g., recent historic path data versus location data) with one or more linear limits of the curved path or curved path plan. In a first example of executing step S114, data processor 18, curvature module 26 or the data processing system 14 estimates a set of projected headings for a current or future vehicle path based on a running average or sliding window of the historic path (e.g., sufficiently recent or immediately preceding the current or future vehicle path).

In a second example of executing step S114, the data processor 18, curvature module 26 or the data processing system 14 estimates a set of projected headings for a current or future vehicle path based on an predetermined linear path segment (e.g., A-B line) that is aligned with the one or more crop rows or parallel to the previous crop rows. In step S114, the first and second examples may be executed together or separately.

In a third example of executing step S114, the linear limit may be based on any of the following factors: (1) a length or distance of the historic path or historic path segments, (2) the precision or reliability level of the historic heading data 32 or historic location data from the location-determining receiver 10 (e.g., based on availability of differential correction data, real-time kinematic correction data from one or more base stations, or convergence on a carrier phase solution for position, or dilution of precision estimates), (3) heading angle or yaw zone restrictions related to avoiding a boundary of the field or work area, or (4) heading angle or yaw zone restrictions, with or without ground-speed restrictions, related to a keep-out region of a work area or an obstacle in a projected path of the vehicle.

In step S114, any combination or permutation of the above examples may be executed together or separately.

In step S116, the data processor 18 or data processing system 14 determines an observed current path heading of the vehicle. For example, the location-determining receiver 10 may provide the observed current path heading versus location data for a vehicle. Alternately, a wheel angle sensor on a steered wheel or its suspension, alone or together with a dead-reckoning system 11 (e.g., wheel odometer) may provide the observed current path heading versus location data for the vehicle.

In step S118, the data processor 18 or data processing system 14 determines a difference or error between a current path heading and the (second) projected heading (e.g., from step S112 or step S114). For example, the data processor 18 or the data processing system 14 determines or estimates the primary guidance path or the secondary guidance path based on a difference between a current path heading and a projected path heading based on a running average of the historic path heading. In particular, the curvature module 26 may determine the difference for the primary guidance path, whereas the linear module 28 may determine the difference for the secondary guidance path.

In step S120, the data processor 18 or data processing system 14 steers a vehicle based on the difference or error. For example, the data processor 18 or data processing system 14 may steer the vehicle based on the difference or error for a maximum time period, or until a quality measurement of the crop row sensing module 34 or the crop row sensor 46s is re-established.

Figure 5:
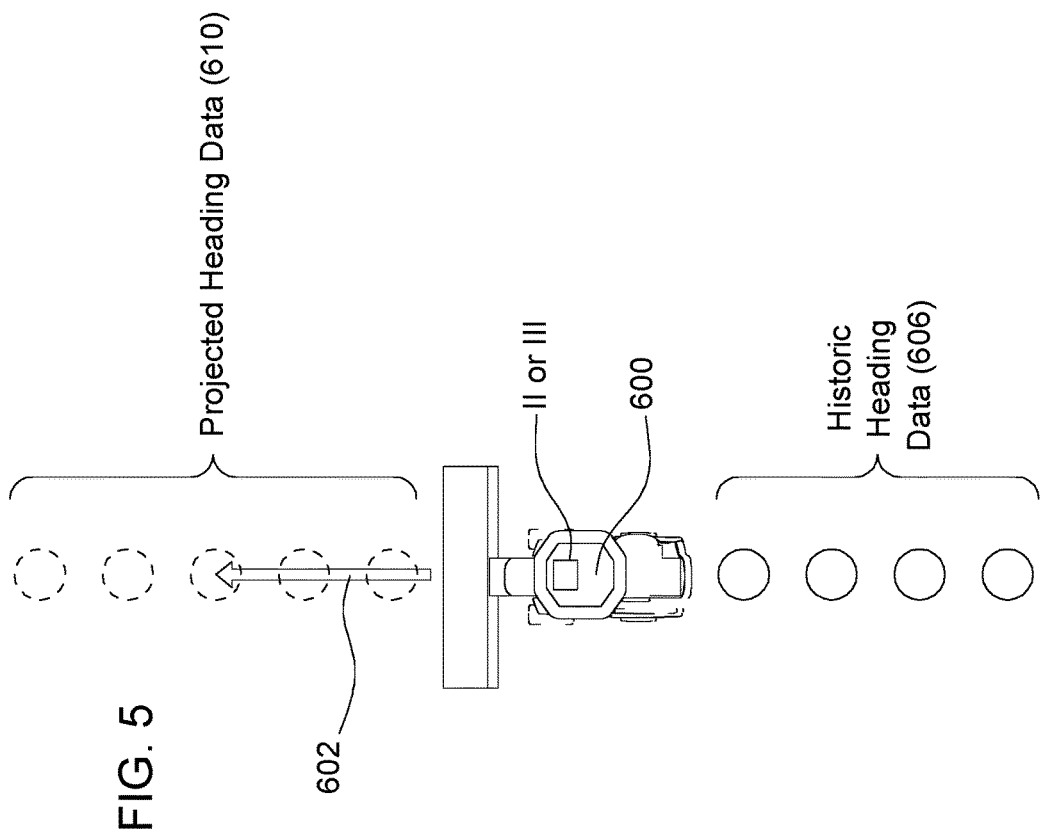
FIG. 5 is a plan view of a vehicle in accordance with a substantially curved historic path, consistent with the method or system of the disclosure.

FIG. 5 is a plan view of a vehicle 600 in accordance with a substantially linear historic path. The vehicle 600 is traveling in the direction of travel 602, as indicated by the arrow. The vehicle 600 carries or uses system 11 or system 111. The historic heading data 606 may be defined as a vehicle heading and a corresponding location for one or more points along the a historic path traversed by the vehicle 600. For example, the historic heading data (606 or 32) or recent historic heading data (606 or 32) may be stored in the data storage device 24 (e.g., buffer memory) of the data processing system 14. In one configuration, the data processing system 14 stores the historic heading data (606 or 32) on a first-in, first-out queue of data records, ring memory, or buffer memory to support a running average or sliding window of the historic path heading data. The projected heading data 610 may be defined as a vehicle heading and a corresponding location for one or more points along a projected path or future path to be traversed by the vehicle. As shown in FIG. 5, the projected heading data 610 of the projected path or future path, or points along it, are indicated by dashed, curved line segments. Typically, the projected heading data 610 or future path immediately follows the recent historic heading data 606 of the recent historic path traversed by the vehicle, where the historic path and its future path are refreshed or updated in the first-in, first-out queue of data records, ring memory or buffer memory for a predetermined time period (e.g., approximately 1 to approximately 180 seconds) as the vehicle progresses along a path or path plan.

Figure 6:
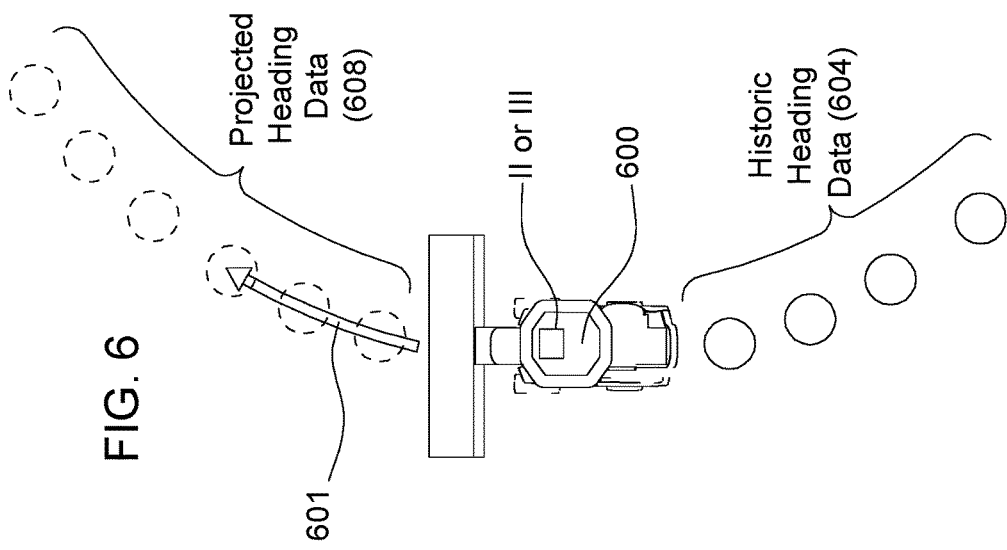
FIG. 6 is a plan view of a vehicle in accordance with a substantially linear historic path, consistent with the method of system of the disclosure.

FIG. 6 is a plan view of a vehicle in accordance with a substantially curved historic path, consistent with the method of system 11 of the disclosure. FIG. 6 is similar to FIG. 5, except in FIG. 6 the vehicle takes a substantially curved historic path and a corresponding substantially curved projected path or future projected path consistent with the substantially linear path. Like reference numbers in FIG. 5 and FIG. 6 indicate like elements or features.

The historic heading data 604 may be defined as a vehicle heading and a corresponding location for one or more points along the a historic path traversed by the vehicle 600. For example, the historic heading data (604 or 32) or recent historic heading data (604 or 32) may be stored in the data storage device 24 (e.g., buffer memory) of the data processing system 14. In one configuration, the data processing system 14 stores the historic heading data (604 or 32) on a first-in, first-out queue of data records, ring memory, or buffer memory to support a running average or sliding window of the historic path heading data. The projected heading data 608 may be defined as a vehicle heading and a corresponding location for one or more points along a projected path or future path to be traversed by the vehicle. As shown in FIG. 6, the projected heading data 608 of the projected path or future path, or points along it, are indicated by circles composed of dashed, curved line segments. Typically, the projected heading data 608 or future path immediately follows the recent historic heading data 604 of the recent historic path traversed by the vehicle, where the historic path and its future path are refreshed or updated in the first-in, first-out queue of data records, ring memory or buffer memory for a predetermined time period (e.g., approximately 1 to approximately 180 seconds) as the vehicle progresses along a path or path plan.

Having described the preferred embodiment, it will become apparent that various modifications can be made without departing from the scope of the invention as defined in the accompanying claims.

The invention claimed is:

1. A method for guidance of an off-road vehicle, the method comprising:
   sensing, by a row sensor, position data for one or more crop rows;
   determining, by an electronic data processor, a primary guidance path of the vehicle based on the sensed position data for the one or more crop rows if there not a material gap in the crop row for the current location of the vehicle; and
   determining, by the data processor, a secondary guidance path of the vehicle based on a historic path heading of the vehicle if there is the material gap in a crop row for a current location of the vehicle, wherein the determining of the secondary guidance path is based on a running average of the historic path heading consistent with a curvature limit of a curved path plan if the estimated curvature of the historic path heading is greater than, or equal to, a threshold.

2. The method according to claim 1 wherein the determining of the primary guidance path is based on a central position between two adjacent crop rows that are sensed by arms of contact sensors.

3. The method according to claim 1 wherein the determining of the secondary guidance path is based on the historic path heading consistent with headings estimated by a location-determining receiver for corresponding historic locations of the vehicle.

4. The method according to claim 1 wherein the estimated curvature is determined based on the following equation: $C=\Delta P/D$, where C is the curvature, $\Delta P$ is the path heading change, and D is the path distance.

5. The method according to claim 4 wherein the threshold is equal to approximately 0.5.

6. The method according to claim 1 wherein the determining of the secondary guidance path is based on a running average of the historic path heading consistent with a linear limit of a curved path plan if the estimated curvature of the historic path heading is less than a threshold.

7. The method according to claim 1 wherein the estimated curvature is determined based on the following equation: $C=\Delta P/D$, where C is the curvature, $\Delta P$ is the path heading change, and D is the path distance.

8. The method according to claim 4 wherein the threshold is equal to approximately 0.5.

9. The method according to claim 1 further comprising:
   determining the primary guidance path or the secondary guidance path based on a difference between a current path heading and a projected path heading based on a running average of the historic path heading.

10. The method according to claim 9 further comprising: steering a vehicle based on the determined difference.

11. A system for guidance of an off-road vehicle, the method comprising:
    a row sensor for sensing position data for one or more crop rows;
    a crop row sensing module for determining a primary guidance path of the vehicle based on the sensed position data for the one or more crop rows if there not a material gap in the crop row for the current location of the vehicle;
    a data processor for determining a secondary guidance path of the vehicle based on a historic path heading of the vehicle if there is the material gap in a crop row for a current location of the vehicle; and
    a curvature module for determining of the secondary guidance path based on a running average of the historic path heading consistent with a curvature limit of a curved path plan if the estimated curvature of the historic path heading is greater than, or equal to, a threshold.

12. The system according to claim 11 wherein the row sensor further comprises a pair of crop row sensors with contact arms for contacting one or more plants in the one or more crop rows and producing an electrical signal associated with such contacting of the one or more plants, wherein the crop row sensing module is adapted to determine a central position between two adjacent crop rows that are sensed by the pair of the crop crow sensors.

13. The system according to claim 11 further comprising:
    a location-determining receiver for determining of the secondary guidance path based on the historic path heading consistent with headings estimated by a location-determining receiver for corresponding historic locations of the vehicle.

14. The system according to claim 11 wherein:
    the data processor arranged to determine the estimated curvature in accordance with the following equation: $C=\Delta P/D$, where C is the curvature, $\Delta P$ is the path heading change, and D is the path distance.

15. The system according to claim 11 wherein the threshold is equal to approximately 0.5.

16. The system according to claim 11 further comprising:
    a linear module for the determining of the secondary guidance path based on a running average of the historic path heading consistent with a linear limit of a curved path plan if the estimated curvature of the historic path heading is less than a threshold.

17. The system according to claim 16 wherein:
    the data processor is arranged to determine the estimated curvature in accordance with the following equation: $C=\Delta P/D$, where C is the curvature, $\Delta P$ is the path heading change, and D is the path distance.

18. The system according to claim 16 wherein the threshold is equal to approximately 0.5.

19. The system according to claim 11 wherein:
    the data processor is adapted to determine the primary guidance path or the secondary guidance path based on a difference between a current path heading and a projected path heading based on a running average of the historic path heading.

20. The system according to claim 11 further comprising:
    a steering controller for steering a vehicle based on the determined difference.

* * * * *